(12) United States Patent
Semb

(10) Patent No.: US 11,866,286 B2
(45) Date of Patent: Jan. 9, 2024

(54) APPARATUS FOR STORING CABLE

(71) Applicant: ALMEK HYDRAULIC SERVICES AS, Stokke (NO)

(72) Inventor: Ole-Fredrik Semb, Tolvsrød (NO)

(73) Assignee: ALMEK HYDRAULIC SERVICES AS, Stokke (NO)

( * ) Notice: Subject to any disclaimer, the term of this patent is extended or adjusted under 35 U.S.C. 154(b) by 652 days.

(21) Appl. No.: 17/048,133

(22) PCT Filed: Mar. 26, 2019

(86) PCT No.: PCT/NO2019/050063
§ 371 (c)(1),
(2) Date: Oct. 16, 2020

(87) PCT Pub. No.: WO2019/216770
PCT Pub. Date: Nov. 14, 2019

(65) Prior Publication Data
US 2021/0147173 A1    May 20, 2021

(30) Foreign Application Priority Data
May 9, 2018   (NO) .................................. 20180665

(51) Int. Cl.
*B65H 49/28*       (2006.01)
*B65H 49/30*       (2006.01)
(Continued)

(52) U.S. Cl.
CPC ............. *B65H 49/28* (2013.01); *B63B 35/00* (2013.01); *B65H 49/30* (2013.01); *B65H 49/34* (2013.01);
(Continued)

(58) Field of Classification Search
CPC ........ B65H 49/28; B65H 49/30; B65H 49/34; B65H 2701/32; B65H 2701/34; B63B 35/00
See application file for complete search history.

(56) References Cited

U.S. PATENT DOCUMENTS 3,952,962 A    4/1976 Kidd
4,647,253 A    3/1987 Jacobson
(Continued)

FOREIGN PATENT DOCUMENTS

| EP | 2085308 | 8/2009 |
|---|---|---|
| GB | 2533113 | 6/2016 |
| JP | 2017204935 | 11/2017 |

OTHER PUBLICATIONS

International Search Report issued in PCT/NO2019/050063, dated Jun. 6, 2019, pp. 1-3.
(Continued)

*Primary Examiner* — Sang K Kim
(74) *Attorney, Agent, or Firm* — Jeffrey S. Melcher; Melcher Patent Law PLLC

(57) ABSTRACT

The invention relates to an apparatus for storing cable, comprising a cable carousel (1) rotatable about a vertical axis (2), and rotating means (30) for rotating (4) the carousel (1) about the vertical axis (2), for allowing winding cable (5) on the carousel (1) and unwinding cable (5) from the carousel (1). The carousel (1) is received in a pool (7), a seal (10) is arranged between an outer side (12) of the carousel (1) and a pool outer wall (9). A closed chamber (13) is defined in the pool (7) below the carousel (1), and pressurized liquid in the closed chamber (13) provides a positive pressure for supporting the carousel (1) and allowing rotation (4) of the carousel (1).

16 Claims, 5 Drawing Sheets

(51) Int. Cl.
  *B65H 49/34*     (2006.01)
  *B63B 35/00*     (2020.01)
(52) U.S. Cl.
  CPC ...... *B65H 2701/32* (2013.01); *B65H 2701/34* (2013.01)

(56) References Cited

U.S. PATENT DOCUMENTS

2003/0056682 A1    3/2003    Hill
2020/0103050 A1*   4/2020    van den Berg ......... B63B 35/04

OTHER PUBLICATIONS

Written Opinion issued in PCT/NO2019/050063, dated Jun. 6, 2019, pp. 1-5.

* cited by examiner

APPARATUS FOR STORING CABLE

The invention relates to an apparatus for storing cable, comprising a cable carousel rotatable about a vertical axis; and rotating means for rotating the carousel about the vertical axis, for allowing winding cable on the carousel and unwinding cable from the carousel. The invention also relates to a pool for use in the apparatus, and a method for constructing the apparatus.

A cable carousel, also known as a cable turntable, is a horizontal disc used for storing large lengths of cable during and after cable production, and during cable laying. The cable is typically optical fibre cable or electrical cable. A cable carousel is driven for rotation about a vertical axis. This can be achieved by the cable carousel having several wheels which run along circular horizontal rails on the ground, much like a railway. At least some wheels may be driven. Cable carousels can be large constructions, the biggest having a diameter of 40 metre and a capacity of 10000 tonnes cable.

This conventional cable carousel has the drawback that it is expensive to build. Another drawback is that the wheels are driven by electric motors on the carousel, which means that electrical power must be transferred to the carousel by sliprings, which complicates the use of the carousel. A further drawback is that the operational reliability is lower than desirable. High operational reliability is very important, since an interruption of operation may lead to cable breakage with large economic consequences. A still further drawback is the large loading of the ground by the rails, which necessitates an extensive foundation for the rails.

The purpose of the invention is to solve or reduce at least one of the above problems, or at least provide an alternative to prior art.

The purposes of the invention are achieved by an apparatus according to claim 1, a pool according to claim 13 and a method according to claim 15. Further features, advantages and purposes of the invention and how they are achieved will appear from the description, the drawings and the claims.

The invention thus relates to an apparatus for storing cable, comprising a cable carousel rotatable about a vertical axis; and rotating means for rotating the carousel about the vertical axis, for allowing winding cable on the carousel and unwinding cable from the carousel.

Rotatability about the vertical axis may be provided by a radial bearing or by external, stationary, horizontal wheels arranged along the circumference of the carousel for securing the carousel laterally while allowing rotation. Rotating means for rotating the carousel about the vertical axis may be a belt, wheels or gears cooperating with the carousel.

According to the invention the carousel is received in a pool defined by a bottom and an outer wall. Further a seal is arranged in a pool gap between an outer side of the carousel and the pool outer wall. Portions of the carousel below the seal is liquidtight, and the seal, the portions of the carousel below the seal, the pool bottom, and the pool outer wall thereby define a closed chamber. Pressurised liquid in the closed chamber provides a positive pressure for supporting the carousel and allowing rotation of the carousel.

The pool may be made in any way. The pool bottom may be made from concrete or comprise a liquidtight membrane arranged on a foundation. "Liquidtight membrane" shall mean any kind of liquidtight foil, canvas, web or fabric. "Outer wall" shall mean any means that defines the pool. The seal may be attached to the carousel, and slide against the pool outer wall. The seal may be located at the edge of a carousel floor, and to provide the closed chamber, the carousel floor must then be liquidtight. Alternatively, the seal may be located on the carousel outer wall, and then the carousel floor as well as the carousel outer wall below the seal must be liquidtight to provide the closed chamber. In another embodiment the seal may be attached to the pool outer wall, and slide against the carousel. In this case, the carousel floor and the carousel outer wall below the seal must be liquidtight to provide the closed chamber. The seal must seal during sliding and endure long-term use, and may be made from rubber. Pressurised liquid may be supplied from a pump or from an external source.

Preferably means for regulating a supply of pressurised liquid to the closed chamber and removal of liquid from the closed chamber regulates an elevation of the carousel. It is further preferred that the apparatus comprises hold-down means for holding down the carousel, to keep the carousel horizontal.

The invention also relates to a method for constructing the carousel and the pool according to the invention. In this method the carousel is fabricated in sections, typically from steel plates that are welded together. This can be done in a factory, which typically is not located at a construction site where the carousel is to be used. Further, according to the method of the invention, the pool is constructed at the construction site. The pool may be constructed of concrete, but other ways of constructing the pool are possible, e.g. making the outer wall from a self-supporting steel ring with a lower portion supported by the ground, and using a liquidtight membrane as the bottom. After the pool is constructed, the items for centring, driving, holding-down and levelling the carousel as well as valves, required tubes or hoses and instruments, are mounted. The carousel sections are then arranged in the pool, which is typically done by means of a lifting crane. The carousel sections are then assembled to form the carousel, which is typically done by placing gaskets between the sections and bolting them together. After the carousel is completed, pressurised liquid is filled in the pool, which lifts the carousel above the pool bottom. The operation of the apparatus according to the invention can then start.

The carousel sections will probably be fabricated by a different contractor than the pool. The claims are intended to protect the carousel and the pool both as separate items as well as in combination.

The invention will now be described with reference to the accompanying drawings, in which.

Figure 1:
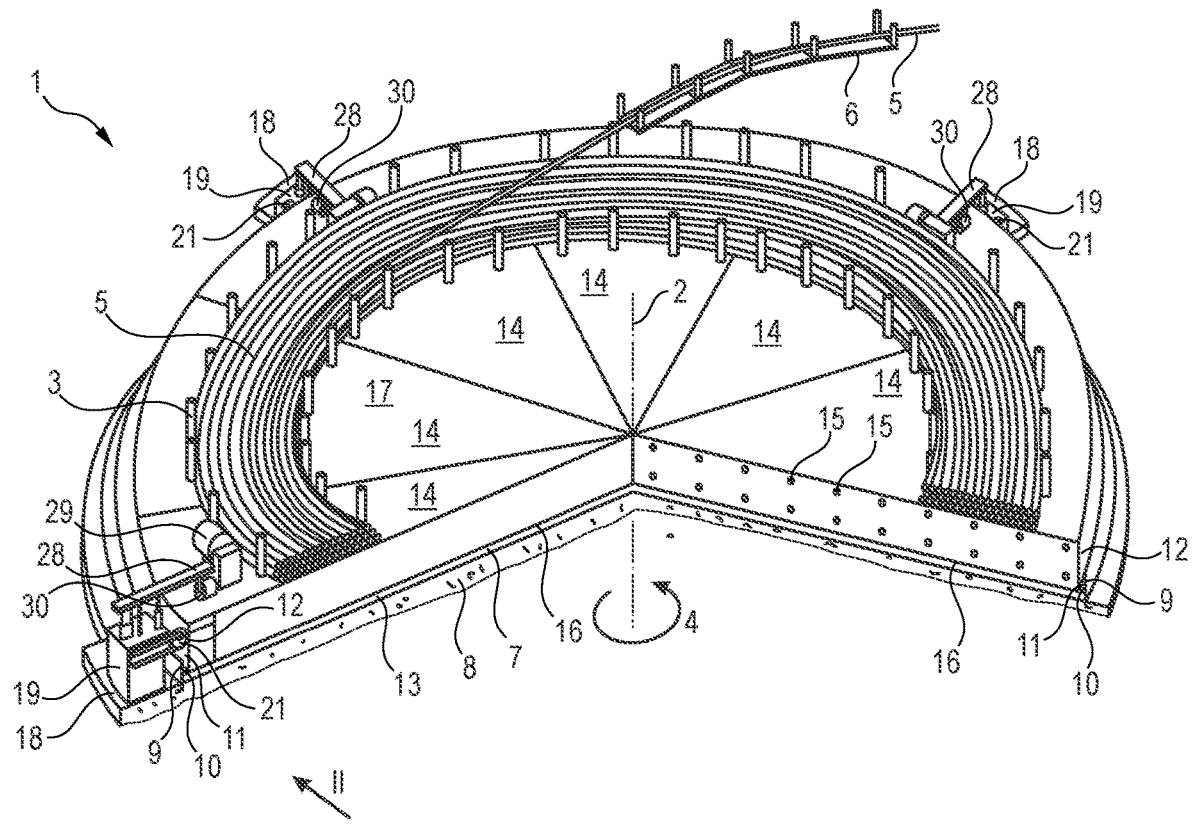
FIG. 1 is a cutaway view of a cable carousel supported by a pool according to the invention.

FIG. 1 is a cutaway perspective view of a cable carousel 1 for storing cable according to the invention, seen obliquely from above. Cable carousel 1 is composed of sections 14 which are welded steel constructions mainly made of plates. Sections 14 have upper and lower sides with the shape of a sector of a circle, and are held together by not illustrated bolts through bolt holes 15 in their lateral sides, as seen for the rightmost section 14. The leftmost section 14 is radially cut through, and therefore no bolt holes are seen in this section. Together the cable carousel sections 14 form a carousel floor 16, a carousel top 17 and a carousel outer side 12. Gaskets between sections 14 ensure that at least carousel floor 16 is liquidtight. A coil of cable 5 is held in place on carousel top 17 by vertical posts 3 secured to carousel top 17. Cable 5 can be passed to and from carousel 1 via a guide arm 6 not forming part of the invention.

Carousel 1 is received in a pool 7 which is circular about a vertical axis 2. Pool 7 is defined by a concrete bottom 8 and an outer steel wall 9. Pool outer wall 9 faces carousel outer side 12, and a pool gap 11 is defined between them. A seal 10 is attached to carousel outer side 12 in the corner area between carousel outer side 12 and carousel floor 16, and seals against pool outer wall 9 in pool gap 11. As mentioned above, carousel floor 16, i.e. the portions of carousel 1 below seal 10, is liquidtight. Pool bottom 8 and pool outer wall 9 are also liquidtight, and together with carousel floor 16 and seal 10, these elements form a closed chamber 13. Closed chamber 13 is filled with pressurised liquid which provides a positive pressure that supports carousel 1 and makes carousel 1 movable.

A large cable carousel may have a capacity of 10000 tonnes cable, i.e. the cable weighs $10^8$ Newton. The radius of such a cable carousel may be 20 metres, i.e. the area of carousel floor 16 is $\pi \times 20^2 = 1256$ m$^2$. The contribution to the pressure in closed chamber 13 from the weight of the cable is thereby $10^8$ N/1256 m$^2$ = 80 kN/m$^2$ = 0.8×105 N/m$^2$ = 0.8 bar.

Figure 2:
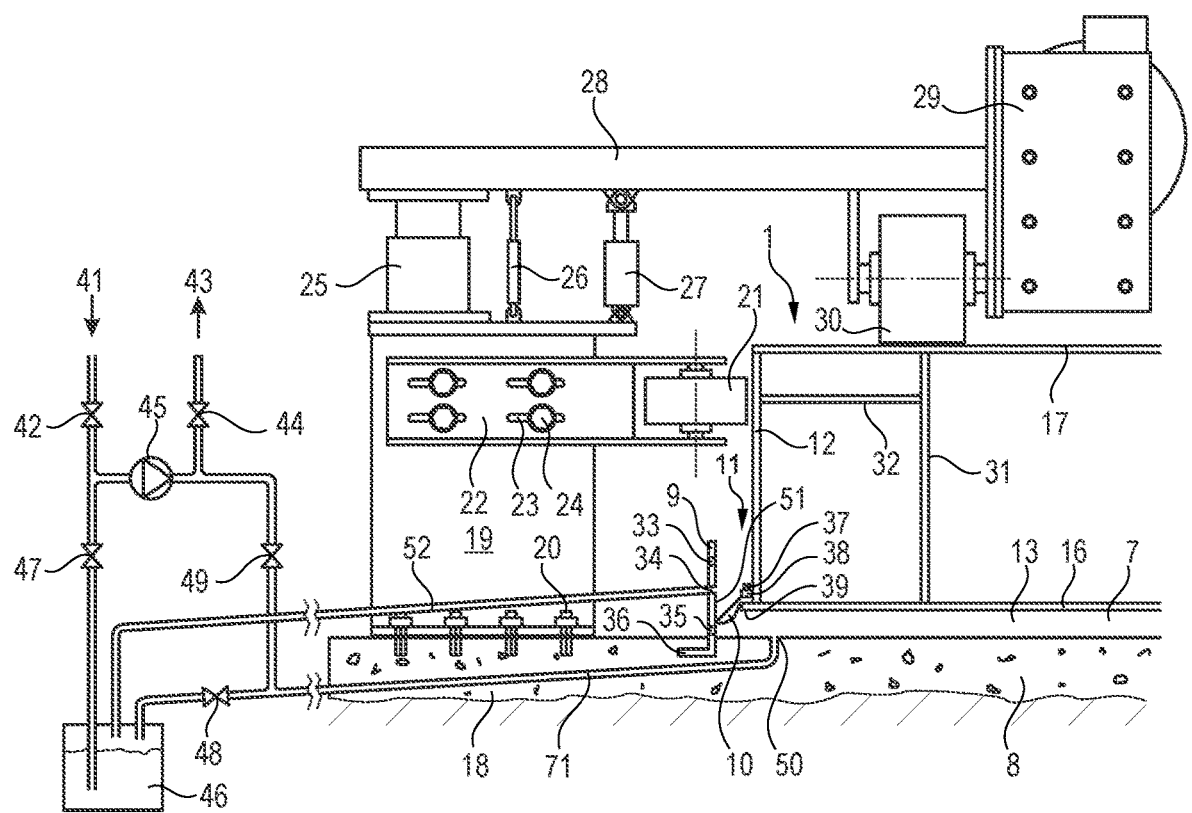
FIG. 2 shows a combined centring, driving, hold-down and levelling unit, and a first way of sealing and operating the pool in FIG. 1.

FIG. 2 is a closer view of the lower left portion of FIG. 1, seen in direction II. An extension of the concrete pool bottom 8 forms a foundation 18. A base 19 made by welded steel plates is secured to the foundation 18 by anchor bolts 20, and a centring wheel bracket 22 is attached to base 19 by bolts 24. A free-running centring wheel 21 with a vertical rotation axis is attached to centring wheel bracket 22. Centring wheel bracket 22 has adjustment slots 23 that allow horizontal adjustment relative to base 19, which means that the horizontal distance between centring wheel 21 and carousel outer side 12 is adjustable. Adjusting this distance allows restricting the horizontal movement of carousel 1. A horizontal stiffening plate 32 stiffens carousel outer side 12 and distributes the load from centring wheel 21. FIG. 1 shows three centring wheels 21, and there is one more for the cutaway portion of carousel 1, i.e. there are a total of four centring wheels 21, which allows centring carousel 1 in pool 7.

A horizontal support beam 28 is supported and held in place by a combined linear bearing/hydraulic cylinder 25 and a hydraulic cylinder 27, which in turn are attached to base 19 by not illustrated bolts. A linear transducer 26 measures the elevation of support beam 28 relative to base 19. A hold-down wheel 30 is rotatably attached to support beam 28, with a horizontal rotation axis parallel to the radial direction of carousel 1. Hold-down wheel 30 touches carousel top 17 and restricts vertical upwards movement of carousel 1. An electric motor/gearbox unit 29 is attached to the end of support beam 28, for driving hold-down wheel 30, for rotating carousel 1. A vertical stiffening plate 31 stiffens carousel top 17 and distributes the load from hold-down wheel 30. FIG. 1 shows three hold-down wheels 30, and there is one more for the cutaway portion of carousel 1, i.e. there are a total of four hold-down wheels 30.

FIG. 2 further shows an extension 39 of carousel floor 16, forming a nose beyond carousel outer side 12. Seal 10 is clamped between nose 39 and a flat bar 38 by means of bolts 37.

Pool outer wall 9 is formed by a vertical steel plate with an angled portion 36 cast in concrete bottom 8. Pool outer wall 9 has a circular sealing surface 51 facing carousel outer side 12. Sealing surface 51 is smooth to allow seal 10 to slide and seal against it during rotation. Sealing surface 51 does not need to extend over the whole of pool outer wall 9, it is sufficient that sealing surface 51 extends over the sealing area for seal 10 in various operating elevations of carousel 1. An overflow line 52 has an overflow inlet 34 in sealing surface 51. Pool outer wall 9 further has a pressure sensor 35 in its lower portion, below seal 10, to measure the pressure in closed chamber 13, and a liquid sensor 33 in its higher portion, to initiate an alarm if the liquid level in pool gap 11 reaches the height of liquid sensor 33.

FIG. 2 further shows liquid lines with an external liquid supply 41 with an external supply valve 42, an external liquid discharge 43 with an external discharge valve 44, a pump 45, a reservoir 46, a reservoir valve 47, a drain valve 48, a pool inlet/outlet valve 49, and a pool inlet/outlet line 71 with a pool inlet/outlet 50 in pool 7. Reservoir 46 is illustrated much smaller than it really is. Reservoir 46 is located below pool 7, to enable gravity draining from pool 7 to reservoir 46.

The liquid may be an oil. Preferably, however, for both environmental and economic reasons, the liquid is water, possibly with additives such as glycol or another antifreeze, corrosion inhibitor and biocide.

To start the operation of carousel 1 in FIGS. 1 and 2, carousel 1 is placed on pool bottom 8 when dry. Seal 10 seals against pool outer wall sealing surface 51 in pool gap 11. It is thereby created a closed chamber 13 defined by seal 10, carousel floor 16, pool bottom 8 and pool outer wall 9 below seal 10. Assuming the liquid is water, water is initially supplied from external liquid supply 41, which typically is the municipal waterworks, through external supply valve 42 and reservoir valve 47 to reservoir 46, while pump 45 is stopped and the other valves are closed. In reservoir 46, the water is mixed with additives. The water is supplied from reservoir 46 to pool inlet/outlet 50 by running pump 45 while reservoir valve 47 and pool inlet/outlet valve 49 are open, while the other valves are closed. Water then enters and pressurises closed chamber 13, which lifts carousel 1 off pool bottom 8.

When carousel 1 has been lifted off pool bottom 8, it is horizontally movable. Carousel 1 is centred in pool 7 by means of the four centre wheels 21. This centring ensures that seal 10 seals properly.

Closed chamber 13 is filled until carousel top 17 touches hold-down wheels 30. To ensure enough friction between hold-down wheels 30 and carousel top 17 to enable transfer of rotation, the downward force from hold-down wheels 30 is regulated by the pressure in linear bearing/hydraulic cylinder 25 and hydraulic cylinder 27. As discussed above, a load of 10000 tonnes of cable causes a pressure of 0.8 bar in closed chamber 13. A load of perhaps a few tonnes from hold-down wheels 30 will therefore have little influence on the pressure in closed chamber 13.

To prevent carousel outer side 12 from hitting pool outer wall 9, and to ensure that seal 10 seals properly, it is required to make carousel outer side 12 parallel with pool outer wall 9. This is achieved by levelling carousel 1, i.e. making carousel top 17 horizontal, which is achieved by adjusting all hold-down wheels 30 to the same elevation.

Electric motor/gearbox unit 29 is then started to drive hold-down wheels 30 to rotate carousel 1. Since carousel 1 is centred in pool 7, and since pool 7 is circular about vertical axis 2, carousel 1 now rotates about vertical axis 2, as illustrated in FIG. 1 with reference numeral 4 for a rotational direction that allows winding cable 5 on carousel 1. Carousel 1 is now in operation, and cable 5 can be wound on and unwound from carousel 1 by means of guide arm 6, as illustrated in FIG. 1.

During operation, hold-down wheels 30 touches carousel top 17, and the elevation of carousel 1 can thereby indirectly be measured by linear transducer 26. Carousel 1 may be raised during operation by raising linear bearing/hydraulic cylinder 25 and hydraulic cylinder 27, and at the same time adding water to closed chamber 13, which is carried out as during initial filling of water. Carousel 1 may be lowered during operation by lowering linear bearing/hydraulic cylinder 25 and hydraulic cylinder 27, and at the same time removing water from closed chamber 13, which is carried out by opening drain valve 48. The force from hold-down wheels 30 may be regulated during operation by regulating the pressure in linear bearing/hydraulic cylinder 25 and hydraulic cylinder 27, without changing the amount of water in closed chamber 13. The pressure in pool 7, i.e. closed chamber 13, is measured by pressure sensor 35.

Normal operating elevation of carousel 1 is may be 5 cm above pool bottom 8. If for some reason carousel 1 rises above normal operating elevation, carousel 1 will be lowered, as discussed above. However, if the lowering fails and carousel 1 rises so high that seal 10 is level with or above overflow inlet 34, liquid will flow into overflow inlet 34 and further through overflow line 52 to reservoir 46. This removes liquid below seal 10, and carousel 1 is lowered. When carousel 1 has been lowered so much that seal 10 again is below overflow inlet 34, the flow of liquid into overflow inlet 34 stops, and the lowering of carousel 1 stops.

To close down the operation, pool 7 can be emptied by opening drain valve 48, while the other valves are closed. Reservoir 46 can be emptied by running pump 45 while reservoir valve 47 and external discharge valve 44 are open, and the other valves are closed.

The hydraulic cylinders and the electric motors for the hold-down wheels and the pump may be controlled locally or remotely from a control system. The valves may be manual or actuated and remote controlled from the same control system. The sensors may have local displays or be connected to the control system. The control system may have various degrees of automation.

Base 19, centring wheel bracket 22, centring wheel 21, support beam 28, hold-down wheel 30, electric motor/gearbox unit 29 and associated illustrated elements together with not illustrated elements such as bolts and wiring, form a combined centring, driving, hold-down and levelling unit for cable carousel 1. FIG. 1 shows three such units, and there is one more for the cutaway portion of carousel 1. However, any number of three or more such units can be used. Further, it is not required to combine the elements carrying out these functions into one unit, they might as well be separate.

Figure 3:
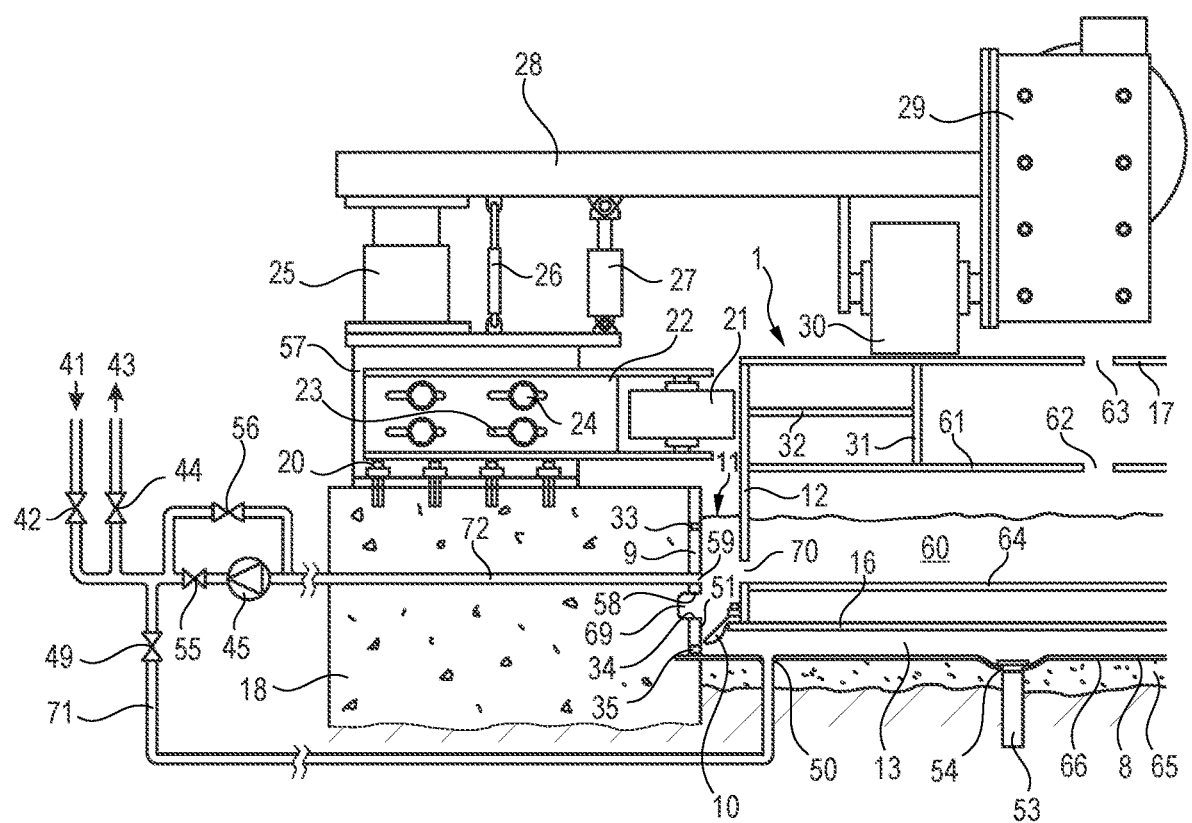
FIG. 3 shows the same combined centring, driving, hold-down and levelling unit, and a second way of sealing and operating the pool in FIG. 1.

FIG. 3 shows another embodiment of the invention. Pool outer wall 9 is made of a steel sheet made from steel coil, which is cast in and backed by a foundation in the form of a concrete ring 18 extending around pool 7. A membrane 66 forming pool bottom 8 is arranged on a foundation 65 of sand, and the edge of membrane 66 is also cast in concrete ring 18, underneath pool outer wall 9. A pool inlet/outlet 50 is formed by a penetration through membrane 66. Pool 7 also has a drain tube 53 to the ground, closed by a plug 54.

Concrete ring 18 forms a foundation for a foot 57, which is anchored to concrete ring 18 by anchor bolts 20. Foot 57 supports a combined centring, driving, hold-down and levelling unit which is identical to that in FIG. 2, and a description of the elements included in this centring, driving, hold-down and levelling and their function as well as other items similar to FIG. 2 will not be repeated.

Pool outer wall 9 has a recess formed by an opening 69 through the steel sheet and an indentation in concrete ring 18 behind opening 69. The lower edge of this recess defines an overflow inlet 34, and the upper edge of the recess defines an overflow outlet 58. Pool outer wall 9 further has a pool gap liquid outlet 59 leading to a pool gap outlet line 72. Pool outer wall 9 further has a pressure sensor 35 in its lower portion, below seal 10, to measure the pressure in closed chamber 13, and a liquid sensor 33 in its higher portion, to initiate an alarm if the liquid level in pool gap 11 reaches the height of liquid sensor 33.

Carousel 1 has a liquid reservoir 60 defined by carousel outer side 12, a reservoir floor 64 and a reservoir roof 61. Reservoir roof 61 has a vent 62, and carousel top 17 has a vent 63. Liquid reservoir 60 communicates with pool gap 11 via an opening 70 in carousel outer side 12 at the bottom of reservoir 60, above seal 10.

FIG. 3 further shows liquid lines with an external liquid supply 41 with an external supply valve 42, an external liquid discharge 43 with an external discharge valve 44, a pump 45, a pump valve 55, a pump bypass valve 56 and a pool inlet/outlet valve 49 in a pool inlet/outlet line 71 leading to pool inlet/outlet 50.

The embodiment of the invention shown in FIG. 3 has no external reservoir. This means there are no place outside carousel 1 to store liquid when pool 7 and carousel reservoir 60 is empty or carousel 1 is outside pool 7. The embodiment in FIG. 3 is therefore particularly suited when the liquid is water without additives which can be drained directly to the ground.

To start the operation of carousel 1 in FIG. 3, carousel 1 is placed on pool bottom 8 when dry. Seal 10 seals against pool outer wall sealing surface 51 and seals pool gap 11. It is thereby created a closed chamber 13 formed by seal 10, carousel floor 16, pool bottom 8 and pool outer wall 9 below seal 10. Assuming the liquid is water, water is initially supplied from external liquid supply 41, which is assumed to have a pressure above pool operating pressure. As an example, external liquid supply 41 may be the municipal waterworks, which may have a pressure of 6 bar. Further, for a particular design, the pool operating pressure have been estimated to 1.8 bar, taking the weight of carousel 1, the weight of cable 5 and the forces from hold-down wheels 30 into consideration. Due to the pressure difference, water flows from external liquid supply 41 to pool inlet/outlet 50 by opening external supply valve 42 and pool inlet/outlet valve 49, while pump 45 is stopped and the other valves are closed. Further start-up of the operation is as for the embodiment in FIG. 2, and this is therefore not repeated.

As for the embodiment in FIG. 2, the elevation of carousel 1 is measured by linear transducer 26. If it is desirable to lower carousel 1 during operation, water can be removed from closed chamber 13 by opening pool inlet/outlet valve 49. If it is desirable to discharge the water, external discharge valve 44 is also opened, while pump 45 is stopped and the other valves are closed. It is assumed that external liquid discharge 43 has atmospheric pressure, and, since the pressure in closed chamber 13 is above atmospheric, water will flow from closed chamber 13 to external liquid discharge 43. Alternatively, the fluid may be stored in liquid reservoir 60 in carousel 1. If this is desirable, pump bypass valve 56 is opened together with pool inlet/outlet valve 49. Since pool gap 11 is open to the atmosphere and therefore has atmospheric pressure, and since the pressure in closed chamber 13 is above atmospheric, water will flow from pool closed chamber 13 to pool gap 11. From pool gap 11 water will flow through reservoir opening 70 into carousel reservoir 60. Vent 62 in reservoir roof 61 and vent 63 in carousel top 17 ensures that the water level is the same in pool gap 11 and carousel reservoir 60.

If it is desirable to raise carousel 1 during operation, water can be added to closed chamber 13 by opening external supply valve 42 and pool inlet/outlet valve 49, while pump 45 is stopped and the other valves are closed. Alternatively, fluid may be supplied from liquid reservoir 60 in carousel 1. If this is desirable, pump 45 is run while pump valve 55 and pool inlet/outlet valve 49 are open, and the other vales are closed. Water is thereby pumped from pool gap 11 to pool closed chamber 13. As the water level in pool gap 11 sinks, water is refilled from carousel reservoir 60 through reservoir opening 70.

If carousel 1 rises above normal operating elevation and lowering as discussed above fails, and carousel 1 rises so high that seal 10 is level with or above overflow inlet 34, liquid will flow from closed chamber 13 into overflow inlet 34 below seal 10, through the recess formed by opening 69, and through overflow outlet 58 into pool gap 11 above seal 10. This removes liquid below seal 10, and carousel 1 is lowered. When carousel 1 has been lowered so much that seal 10 again is below overflow inlet 34, the flow of liquid from below seal 10 to above seal 10 stops, and the lowering of carousel 1 stops.

To close down the operation, carousel reservoir 60 can be emptied by running pump 45 while pump valve 55 and external discharge valve 44 are open, and the other valves are closed. Then pool 7 can be emptied by opening pool inlet/outlet valve 49 and external discharge valve 44, while the other valves are closed.

Figure 4:
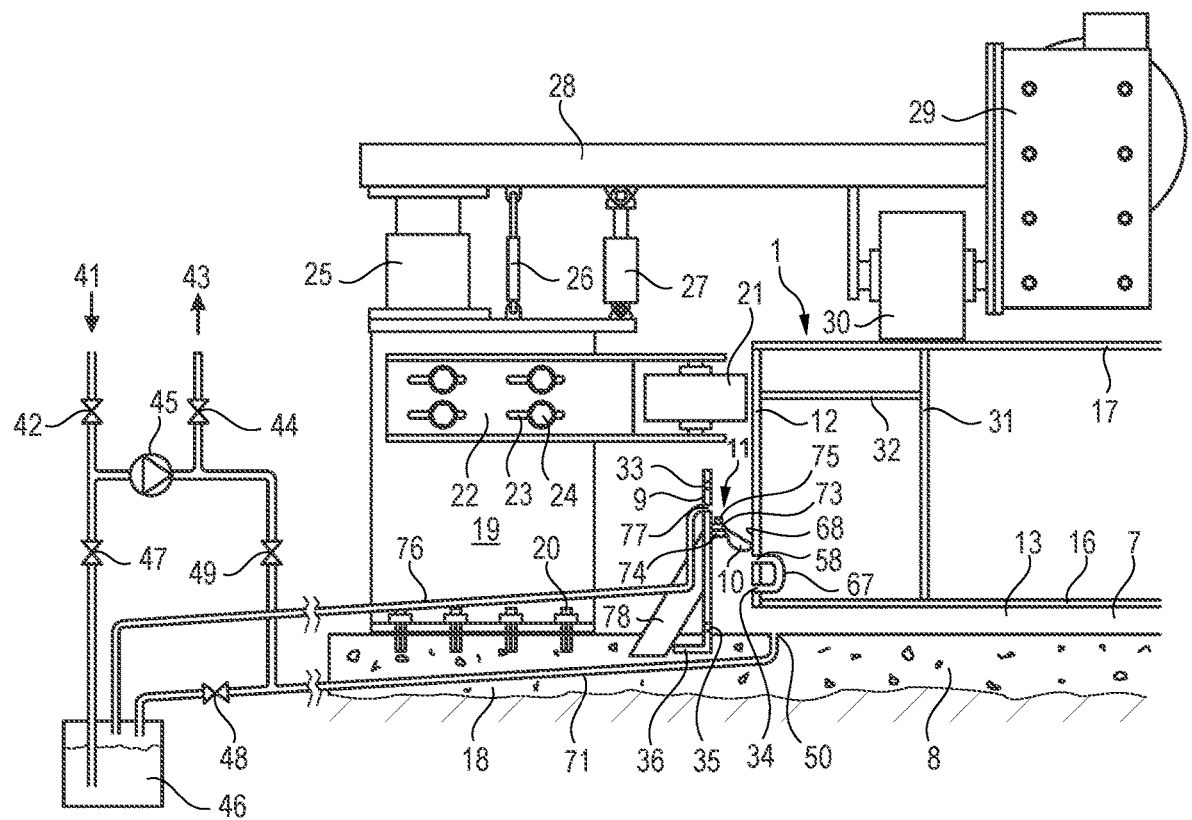
FIG. 4 shows the same combined centring, driving, hold-down and levelling unit, and a third way of sealing and operating the pool in FIG. 1.

FIG. 4 shows another embodiment of the invention. Most of FIG. 4 is identical to FIG. 2, and only elements and functions different from FIG. 2 will be described.

Pool outer wall 9 is made by a circular steel plate with an angled portion 36 and braces 78 cast in the concrete foundation 18. Seal 10 is by means of bolts 75 clamped to pool outer wall 9 between an upper flat bar 73 welded to pool outer wall 9 and a lower flat bar 74. A pool gap drain line 76 extends from an inlet 77 in pool gap 11 to reservoir 46.

In FIG. 4 carousel outer side 12 has a sealing surface 68, and seal 10 slides against this surface. An overflow tube 67 has an inlet 34 and an outlet 58 located in carousel outer side 12, with overflow inlet 34 below overflow outlet 58. In normal operating elevation both overflow inlet 34 and overflow outlet 58 are below seal 10, and overflow tube 67 has pool operating pressure. If carousel 1 for some reason rises so high above normal operating elevation that overflow outlet 58 is level with or above seal 10, liquid will due to the higher pressure in overflow tube 67 flow from overflow outlet 58 into pool gap 11. Liquid thereby flows from closed chamber 13 below seal 10 to pool gap 11 above seal 10, and carousel 1 is lowered. When carousel 1 has been lowered so much that overflow outlet 58 again is below seal 10, the flow of liquid from below seal 10 to above seal 10 stops, and the lowering of carousel 1 stops.

If the liquid level in pool gap 11 rises to pool gap drain line inlet 77, liquid will flow by gravity from pool gap 11, through pool gap drain line 76 to reservoir 46. If the liquid level in pool gap 11 rises further, liquid sensor 33 will detect the presence of liquid and initiate an alarm.

Sealing surface 68 is a smooth portion of carousel outer side 12, in the sealing area for seal 10 in various operating elevations of carousel 1. Overflow outlet 58 is located in sealing surface 68. Overflow inlet 34 can be located anywhere below seal 10 when carousel 1 is in the normal operating elevation. Overflow inlet 34 can e.g. be in carousel floor 16.

Figure 5:
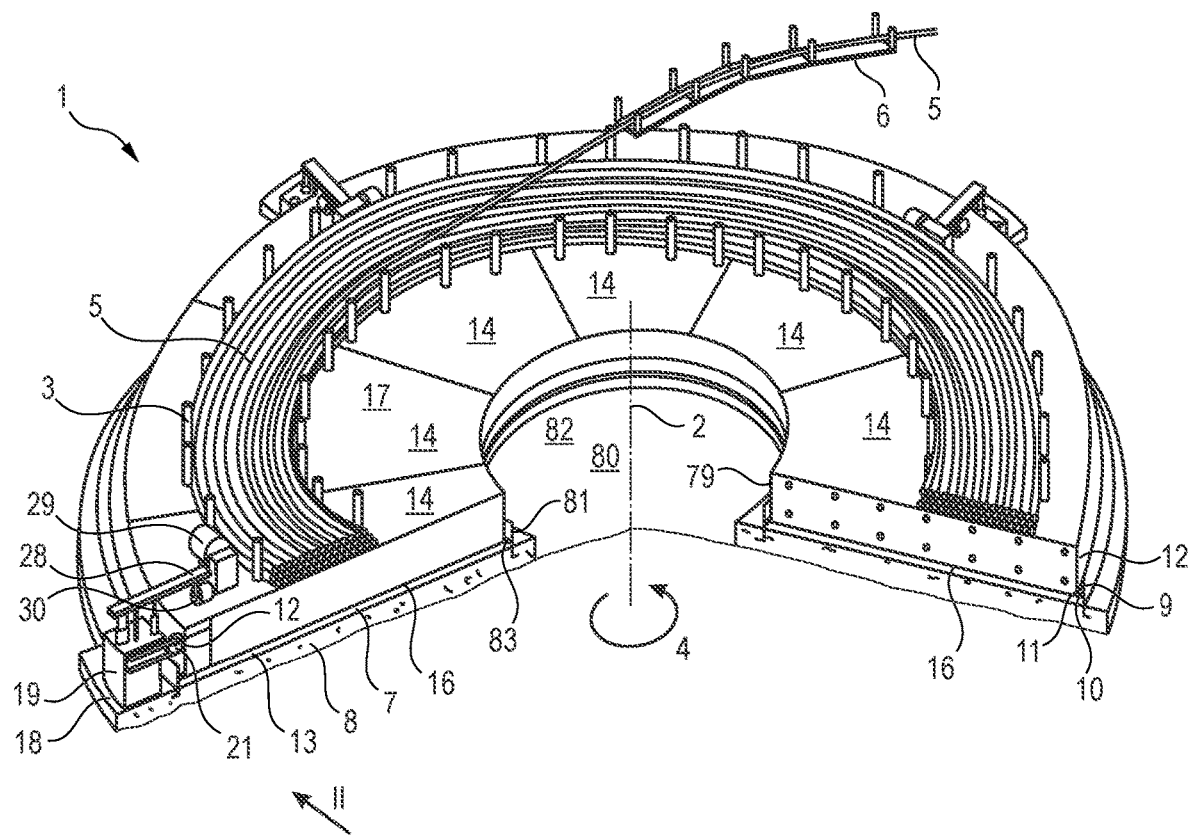
FIG. 5 is a cutaway view of another cable carousel supported by a pool according to the invention.

FIG. 5 is a cutaway view of another cable carousel 1 according to the invention, supported by another pool 7 according to the invention. The outer portion of carousel 1 in FIG. 5 is identical to carousel 1 in FIG. 1. In addition, carousel 1 in FIG. 5 has an inner side 79 defining a carousel central opening 80, and pool 7 has an inner wall 81 defining a pool centre portion 82. Carousel inner side 79 surrounds pool inner wall 81, i.e. pool centre portion 82 is located in carousel central opening 80. Pool centre portion 82 is shown as an empty space. It can, however, be anything that is not in conflict with pool 7 or carousel 1, e.g., a foundation for a lifting crane or a platform. An inner seal 83 between carousel inner side 79 and pool inner wall 81 seals between them and maintains the pressure in closed chamber 13.

Carousel inner side 79, pool inner wall 81, inner seal 83 and their interrelation are similar to carousel outer side 12, pool outer wall 9 and seal 10, i.e. they can be designed in similar ways with corresponding alternatives, and function in similar ways. A detailed description of these items is therefore not included.

The invention claimed is:

1. An apparatus for storing cable comprising:
a cable carousel rotatable about a vertical axis;
rotating means for rotating the carousel about the vertical axis, for allowing winding cable on the carousel and unwinding cable from the carousel;
the carousel is received in a pool defined by a bottom and an outer wall;
a seal is arranged in a pool gap between an outer side of the carousel and the pool outer wall;
portions of the carousel below the seal are liquid tight;
the seal, the portions of the carousel below the seal, the pool bottom, and the
pool outer wall thereby define a closed chamber; and
pressurized liquid in the closed chamber provides a positive pressure for supporting the carousel and allowing rotation of the carousel.

2. The apparatus of claim 1, wherein means for regulating a supply of pressurized liquid to the closed chamber and removal of liquid from the closed chamber regulates an elevation of the carousel.

3. The apparatus of claim 1, comprising hold-down means for holding down the carousel, to keep the carousel horizontal.

4. The apparatus of claim 3, wherein the hold-down means comprise wheels running on the carousel.

5. The apparatus of claim 3, wherein the hold-down means are vertically adjustable, to adjust the elevation of the carousel.

6. The apparatus of claim 1, wherein the pool outer wall has a sealing surface facing the carousel outer side, and the seal slides against the pool outer wall sealing surface.

7. The apparatus of claim 6, wherein the pool outer wall sealing surface has an overflow inlet, the seal is attached to the carousel; when the carousel is in normal operating elevation the seal is below the overflow inlet, when the carousel rises so high above normal operating elevation that the seal is level with or above the overflow inlet, liquid flows from the closed chamber into the overflow inlet.

8. The apparatus of claim 1, wherein the carousel outer side has a sealing surface, and the seal slides against the carousel outer side sealing surface.

9. The apparatus of claim 8, wherein an overflow inlet is located in the carousel below the seal, the carousel outer side sealing surface has an overflow outlet connected to the overflow inlet, the seal is attached to the pool outer wall; when the carousel is in normal operating elevation the overflow outlet is below the seal, when the carousel rises so high above normal operating elevation that the overflow outlet is level with or above the seal, liquid flows from the overflow outlet into the pool gap.

10. The apparatus of claim 1, wherein the carousel comprises a liquid reservoir in communication with the pool gap above the seal.

11. The apparatus of claim 10, wherein the communication is via an opening in the carousel outer side.

12. The apparatus of claim 1, wherein the carousel has an inner side defining a central opening, the pool has an inner wall defining a pool centre portion, the carousel inner side surrounds the pool inner wall, and an inner seal between the carousel inner side and the pool inner wall seals between them and maintains the pressure in the closed chamber.

13. A pool for use in the apparatus of claim 1.

14. The pool of claim 13, wherein the pool bottom comprises a liquid tight membrane arranged on a foundation.

15. The pool of claim 13, wherein the liquid tight membrane is selected from the group consisting of foil, canvas, web, and fabric.

16. A method for constructing the apparatus of claim 1, comprising:
fabricating sections of the carousel;
constructing the pool at a construction site;
arranging the carousel sections in the pool;
assembling the carousel sections to form the carousel; and
filling pressurized liquid in the pool.

\* \* \* \* \*